(12) United States Patent
Goto (10) Patent No.: US 9,247,431 B2
(45) Date of Patent: Jan. 26, 2016

(54) COMMUNICATION APPARATUS, CONTROL METHOD OF COMMUNICATION APPARATUS, AND PROGRAM

(75) Inventor: Fumihide Goto, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 725 days.

(21) Appl. No.: 12/830,156

(22) Filed: Jul. 2, 2010

(65) Prior Publication Data

US 2011/0010760 A1     Jan. 13, 2011

(30) Foreign Application Priority Data

Jul. 7, 2009 (JP) ................................ 2009-160762

(51) Int. Cl.
G06F 21/00 (2013.01)
H04W 12/08 (2009.01)
H04L 29/06 (2006.01)
H04W 84/12 (2009.01)

(52) U.S. Cl.
CPC ........... H04W 12/08 (2013.01); H04L 63/1441 (2013.01); *H04W 84/12* (2013.01)

(58) Field of Classification Search
CPC ... H04W 12/08; H04W 84/12; H04L 63/1441
See application file for complete search history.

(56) References Cited

U.S. PATENT DOCUMENTS

| 2005/0060319 | A1* | 3/2005 | Douglas et al. ................. 707/10 |
| 2007/0073868 | A1* | 3/2007 | Nelson et al. ................. 709/224 |
| 2007/0088951 | A1* | 4/2007 | Nakajima ..................... 713/171 |
| 2008/0066157 | A1* | 3/2008 | Stevens et al. ..................... 726/4 |
| 2009/0092060 | A1 | 4/2009 | Goto |
| 2009/0125713 | A1* | 5/2009 | Karschnia et al. ............. 713/153 |
| 2009/0282467 | A1* | 11/2009 | Schenk .................... H04L 63/10 726/7 |
| 2010/0022231 | A1* | 1/2010 | Heins et al. .................... 455/418 |
| 2010/0046394 | A1 | 2/2010 | Fujii |
| 2010/0082567 | A1* | 4/2010 | Rosenblatt et al. ........... 707/705 |

FOREIGN PATENT DOCUMENTS

| CN | 1953614 A | 4/2007 |
| JP | 2006-311139 A | 11/2006 |
| JP | 2006311139 A * | 11/2006 |
| JP | 2006-352281 A | 12/2006 |
| JP | 2006352281 A * | 12/2006 |
| WO | 2008/093817 A1 | 8/2008 |
| WO | 2009/022673 A1 | 2/2009 |

OTHER PUBLICATIONS

"Wi-Fi Certified for Wi-Fi Protected Setup: Easing the User Experience for Home and Small Office Wi-Fi Networks", 2009 Wi-Fi Alliance.

* cited by examiner

*Primary Examiner* — Michael S McNally
*Assistant Examiner* — Kendall Dolly
(74) *Attorney, Agent, or Firm* — Canon USA, Inc. IP Division (57) ABSTRACT

If automatic setting of communication parameters is performed in an ad hoc network when a communication apparatus is connected to an infrastructure network, there is a possibility that infrastructure network information is leaked to the infrastructure network. When an instruction to start the automatic setting of communication parameters is issued, a network participation state of the communication apparatus is determined and the automatic setting of communication parameters is not performed during enterprise connection.

16 Claims, 6 Drawing Sheets

COMMUNICATION APPARATUS, CONTROL METHOD OF COMMUNICATION APPARATUS, AND PROGRAM

BACKGROUND OF THE INVENTION

1. Field of the Invention

The present invention relates to a communication apparatus, a control method of the communication apparatus, and a program.

2. Description of the Related Art

In wireless communications including a wireless Local Area Network (LAN) conforming to the Institute of Electrical and Electronics Engineers (IEEE) 802.11 standard series (hereinafter, referred to as a wireless LAN), there are many items to be set prior to the use thereof.

Items to be set include, for example, communication parameters necessary for performing wireless communication such as Service Set Identification (SSID) as a network identifier, an encryption method, an encryption key, an authentication method, an authentication key and so on. It is very troublesome for a user to set all these parameters manually. Thus, various manufacturers have discussed automatic setting methods to set communication parameters to wireless devices easily. These automatic setting methods automatically set communication parameters by providing communication parameters from one device to another according to a procedure and messages preset between devices to be connected.

Recently, Wi-Fi Alliance, an industry standards body, has discussed a standard technology (Wi-Fi Protected Setup: WPS) concerning a setting function of communication parameters (http://www.wi-fi.org/files/kc/20090123_Wi-Fi_Protected_Set up.pdf). The WPS specifies an automatic setting method of communication parameters in an infrastructure mode in which a station (child station) performs communication via an access point (base station).

U.S. patent No. 2010-046394 discusses an example of automatic settings of communication parameters in an ad hoc mode in which child stations directly perform communication without passing through a base station.

When communication is temporarily performed between communication devices equipped with a wireless LAN, it is effective to perform communication in the ad hoc mode. In such a case, communication parameters are shared among the communication devices by carrying out communication parameter settings discussed in U.S. Patent No. 2010-046394, so that wireless communication via an ad hoc network can be performed.

However, if communication parameters are set while one of the communication devices is connected to another network, there is a possibility that information in the other network may be leaked to devices newly connected via the ad hoc network. For example, when the device is connected to an intra-company network, leakage of confidential information in the network could become a serious issue.

SUMMARY OF THE INVENTION

The present invention is directed to enhancement of security when setting processing of communication parameters is performed.

According to an aspect of the present invention, a communication apparatus which has a setting function of communication parameters to perform wireless communication with other communication apparatuses includes a determination unit configured to determine a security state of a network in which the communication apparatus participates, and a control unit configured to perform processing to restrict communication parameter setting according to the security state determined by the determination unit.

According to another aspect of the present invention, a method for controlling a communication apparatus which has a setting function of communication parameters to perform wireless communication with other communication apparatuses includes determining a security state of a network in which the communication apparatus participates, and performing processing to restrict communication parameter setting according to the determined security state.

According to yet another aspect of the present invention, a communication apparatus which has a setting function of communication parameters to perform wireless communication with other communication apparatuses includes a determining unit configured to determine whether the communication apparatus is connected to a wired network or a wireless network that performs communication via a base station, and a control unit configured to perform processing to restrict communication parameter setting when the determining unit determines that the communication apparatus is connected to the wired network or the wireless network that performs communication via the base station.

According to yet another aspect of the present invention, a method for controlling a communication apparatus which has a setting function of communication parameters to perform wireless communication with other communication apparatuses includes determining whether the communication apparatus is connected to a wired network or a wireless network that performs communication via a base station, and performing processing to restrict communication parameter setting when it is determined that the communication apparatus is connected to the wired network or the wireless network that performs communication via the base station.

According to yet another aspect of the present invention, a communication apparatus which has a setting function of communication parameters to perform wireless communication with other communication apparatuses includes a confirmation unit configured to confirm whether a setting concerning a wireless network connection of the communication apparatus is WPA-Enterprise, and a control unit configured to perform processing to restrict communication parameter setting when, as a result of confirmation by the confirmation unit, WPA-Enterprise is set.

According to yet another aspect of the present invention, a method for controlling a communication apparatus which has a setting function of communication parameters to perform wireless communication with other communication apparatuses includes confirming whether a setting concerning a wireless network connection of the communication apparatus is WPA-Enterprise, and performing processing to restrict communication parameter setting when, as a result of confirmation, WPA-Enterprise is set.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A communication apparatus according to a first exemplary embodiment will be described in detail below with reference to drawings. While an example using a wireless LAN system conforming to the IEEE802.11 series (hereinafter, simply referred to as a wireless LAN) will be described below, the communication configuration is not limited to the wireless LAN. A case where the WPS is used as an automatic setting function of wireless communication parameters (hereinafter, referred to as communication parameters) will be described below, but other automatic setting functions may be used.

Figure 1:
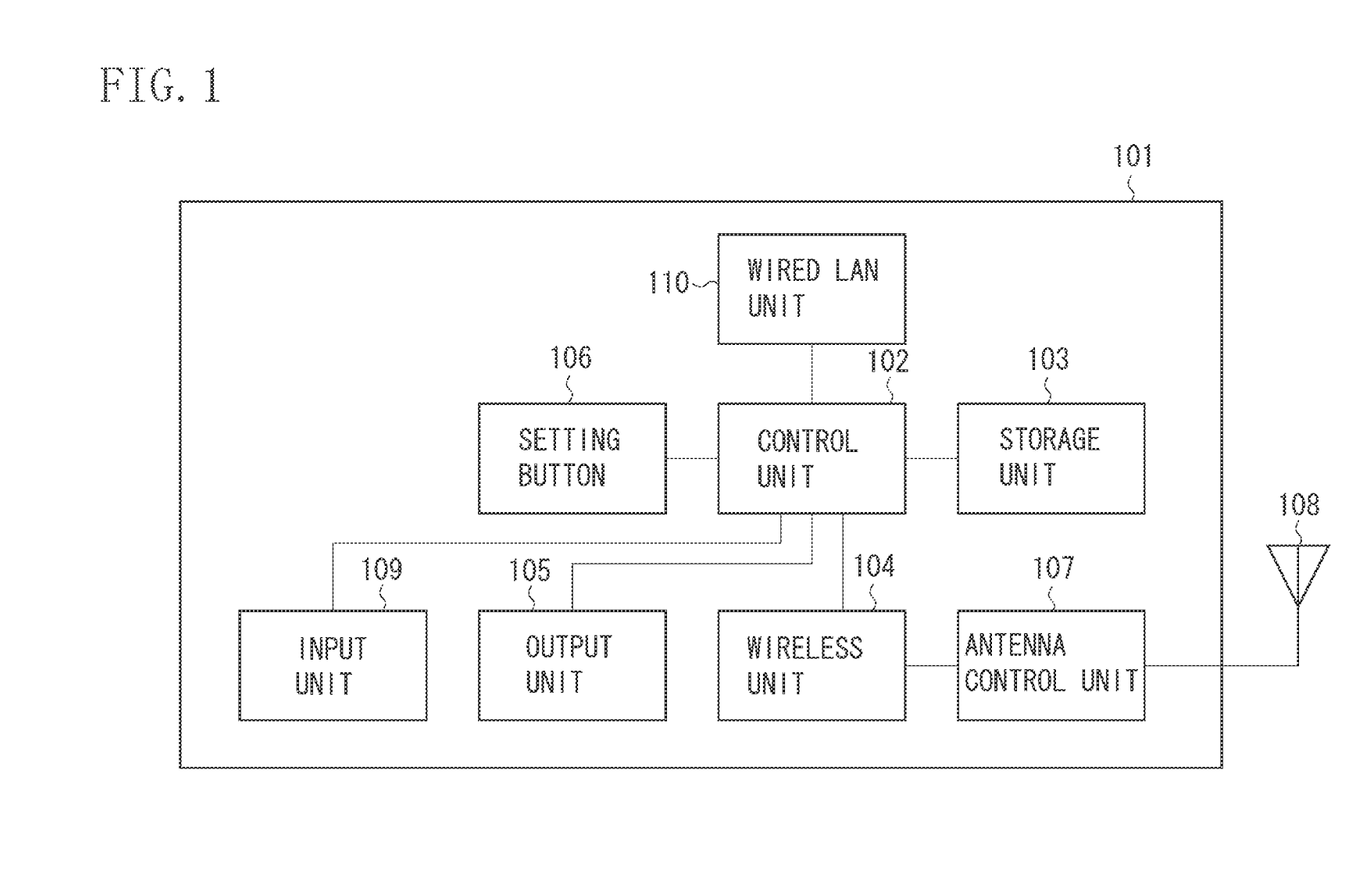
FIG. 1 is a block diagram constituting an apparatus according to each exemplary embodiment.
Figure 2:
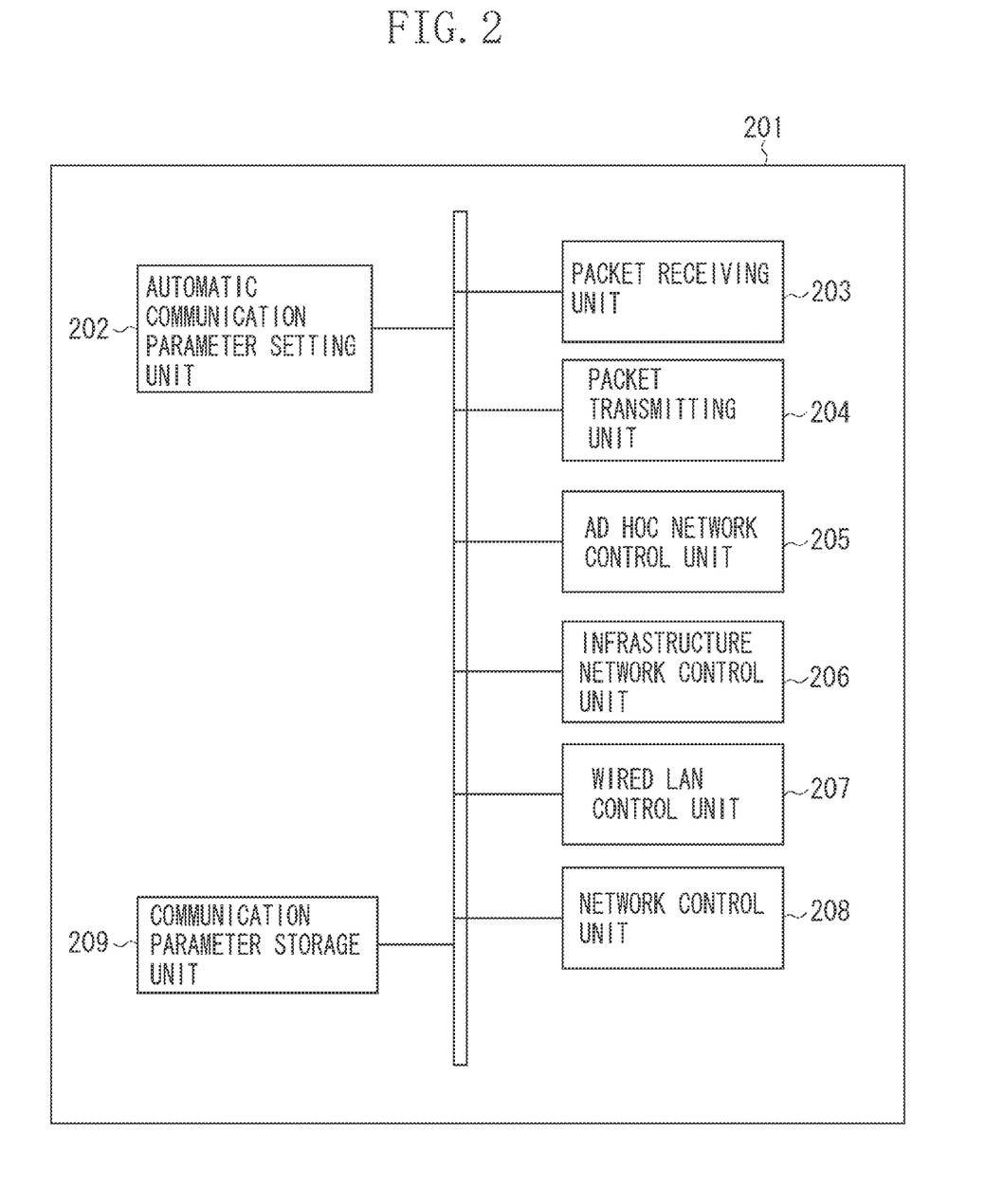
FIG. 2 is a block diagram of software functions inside the apparatus according to each exemplary embodiment.

FIGS. 1 and 2 are block diagrams exemplifying the configuration of each apparatus described below according to exemplary embodiments to which the present invention can be applied. FIG. 1 is an example of hardware configuration.

FIG. 1 illustrates an entire apparatus 101. A control unit 102 controls the entire apparatus by executing a control computer program stored in a storage unit 103. The control unit 102 also performs setting control of communication parameters with other apparatuses. The storage unit 103 stores a control program executed by the control unit 102 and various kinds of information such as communication parameters. Various operations described below are implemented by the control unit 102 executing the control program stored in the storage unit 103. A wireless unit 104 performs wireless LAN communication. An output unit 105 outputs various kinds of information to a user and has a function capable of outputting visually recognizable information like a liquid crystal display (LCD) and a light emitting diode (LED) or a sound like a speaker. The output unit 105 has the function to output at least one of visual information and sound information.

A setting button 106 gives a trigger to start communication parameter setting processing. When the setting button 106 is operated, automatic setting processing of communication parameters is started. The setting button 106 may be provided physically or displayed in the output unit 105 by software. The apparatus 101 includes an antenna control unit 107 and an antenna 108. An input unit 109 is used by the user to input various pieces of data and items. The apparatus also includes a wired LAN unit 110. The apparatus may include not only a wireless network function, but also a wired network function in this manner.

FIG. 2 is a block diagram illustrating the configuration of software function blocks of each apparatus described below. The configuration corresponding to function units in FIG. 1 is not drawn.

FIG. 2 illustrates an entire apparatus 201. A packet receiving unit 203 receives packets for various types of communication. A packet transmitting unit 204 transmits packets for various types of communication. An automatic communication parameter setting unit 202 performs various types of control concerning automatic setting processing of communication parameters. The communication parameters include the network identifier (SSID), the encryption method, the encryption key, the authentication method, the authentication key and so on. In the present exemplary embodiment, communication parameter setting processing for forming an ad hoc network is performed by the automatic communication parameter setting unit 202. An ad hoc network control unit 205 performs control for direct communication of a communication apparatus with another communication apparatus without passing through an access point (base station). An infrastructure network control unit 206 performs control for wireless LAN communication of the communication apparatus via the access point.

A wired LAN control unit 207 performs connection control when the communication apparatus performs communication through the wired LAN connection, instead of the wireless LAN.

A network control unit 208 performs network connection control by linking the ad hoc network control unit 205, the infrastructure network control unit 206, and the wired LAN control unit 207. The network control unit 208 has, for example, a bridge function of the wireless LAN and the wired LAN or a bridge function of the infrastructure network and the ad hoc network.

A communication parameter storage unit 209 stores communication parameters to be provided to other communication apparatuses by automatic setting processing of the communication parameters or the communication parameters acquired from other communication apparatuses by automatic setting processing of the communication parameters.

These function blocks have interrelationships in terms of software or hardware. The above described function blocks are only an example and a plurality of function blocks may constitute a function block or any function block may further be divided into a plurality of function blocks.

Figure 3:
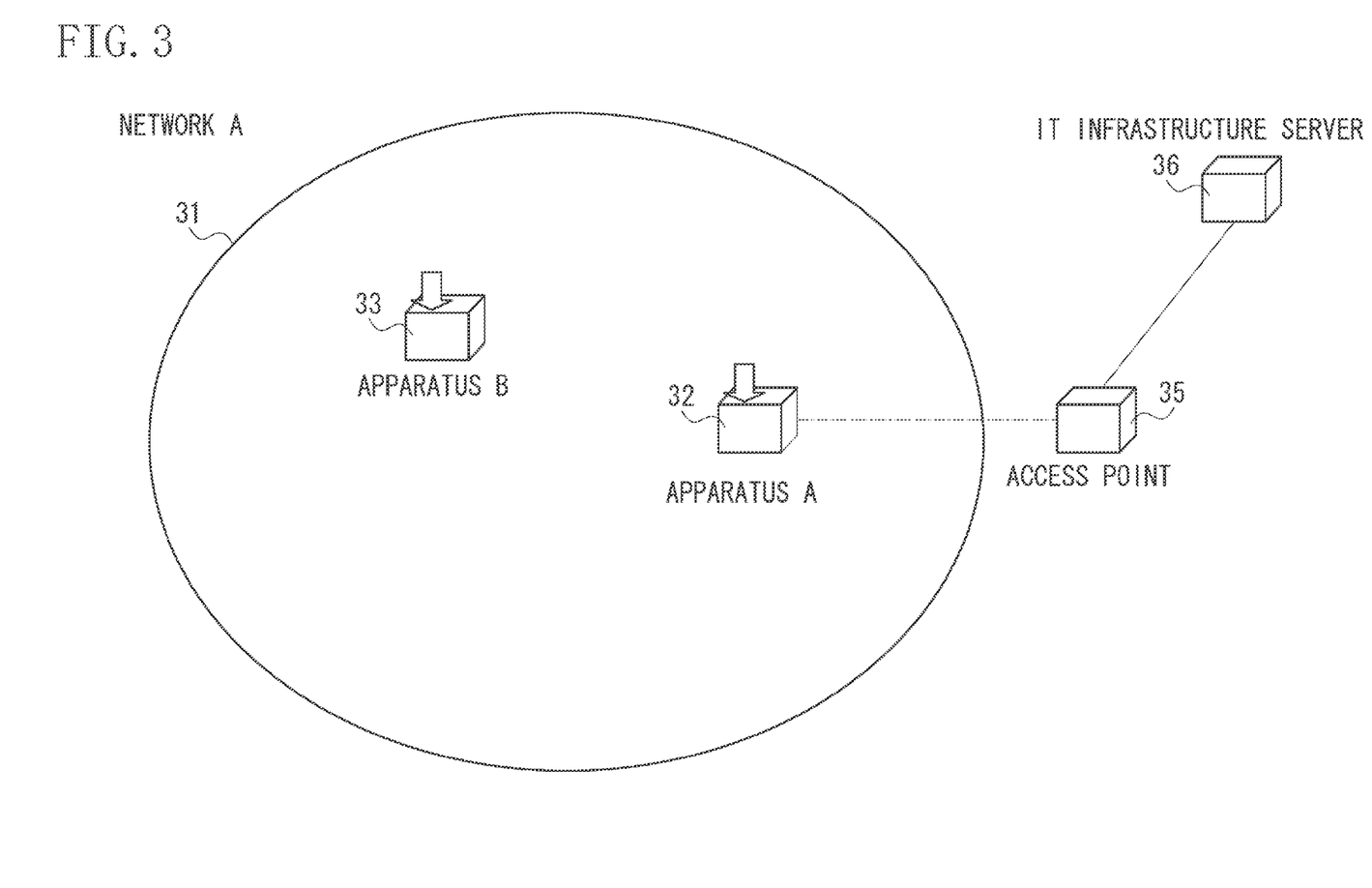
FIG. 3 is a network configuration diagram according to each exemplary embodiment.

FIG. 3 illustrates a system configuration of the present exemplary embodiment. A communication apparatus A (hereinafter, referred to as an apparatus A) 32 and a communication apparatus B (hereinafter, referred to as an apparatus B) 33 include the configuration illustrated in FIGS. 1 and 2. An ad hoc network A (hereinafter, referred to as a network A) 31 is about to be formed by performing automatic settings of the communication parameters in the apparatus A and the apparatus B. There are an access point 35 and an Information Technology (IT) infrastructure server 36 in the system configuration. The access point 35 operates as an access point of an infrastructure network in the IEEE8020.11 standard series and also operates as a connection relay device such as a hub or router in the wired LAN.

The IT infrastructure server 36 is an external authentication server present in a backbone network connected via the access point 35. The IT infrastructure server 36 is a server that performs user authentication or device authentication mainly in an intra-company network and is generally referred to as an Authentication, Authorization, and Accounting (AAA) server.

The apparatus A can establish an infrastructure connection by the wireless LAN or the wired LAN connection with the access point 35. Then, the apparatus A is authenticated by the IT infrastructure server 36 located still farther from the access point 35 via the access point 35 and if the connection is permitted, connection to the backbone network can be established.

In the present exemplary embodiment, a case where an instruction to start (activate) automatic setting of the communication parameters is issued to form the network A between the apparatus A and the apparatus B will be described.

Four cases described below can be considered for the apparatus A when the start of automatic setting of the communication parameters is instructed:
(1) Participating in the infrastructure network
(2) Connected to the wired LAN
(3) Participating in the ad hoc network
(4) Participating in no network Further, the case (1) Participating in the infrastructure network, and the case (2) Connected to the wired LAN, can further be divided into a case where an enterprise connection is established and a case where no enterprise connection is established.

The enterprise connection in the present exemplary embodiment means a connection to a network whose security level is high such as a connection to a network whose connection is permitted when user authentication by a Remote Authentication Dial In User Service (RADIUS) server conforming to the IEEE802.1X standard is successful. More specifically, that is a case where connection is permitted after user validity is authenticated by an external authentication server using an ID and a password, an ID and a certificate, or an ID, a password, and a certificate. The ID may be a user ID for identifying a user of a communication apparatus or a device ID for identifying the communication device itself.

When a password is used, a password stored in a communication apparatus is checked against a password stored in an external authentication server and if the passwords match, connection to the network is permitted. When a certificate is used, authentication using a public key infrastructure (PKI) is performed before connection to the network is permitted. In the case of, for example, the wireless LAN, user authentication processing referred to as Wi-Fi Protected Access (WPA)-Enterprise can be cited as an example thereof. If a configuration in which the user or the communication apparatus is authenticated by an intra-company authentication server, though not IEEE802.1X or WPA-Enterprise, is adopted, such connections are all assumed to be the enterprise connection described in the present exemplary embodiment. Regarding the authentication server, any authentication method can be used as long as user authentication or device authentication can be performed.

Figure 4:
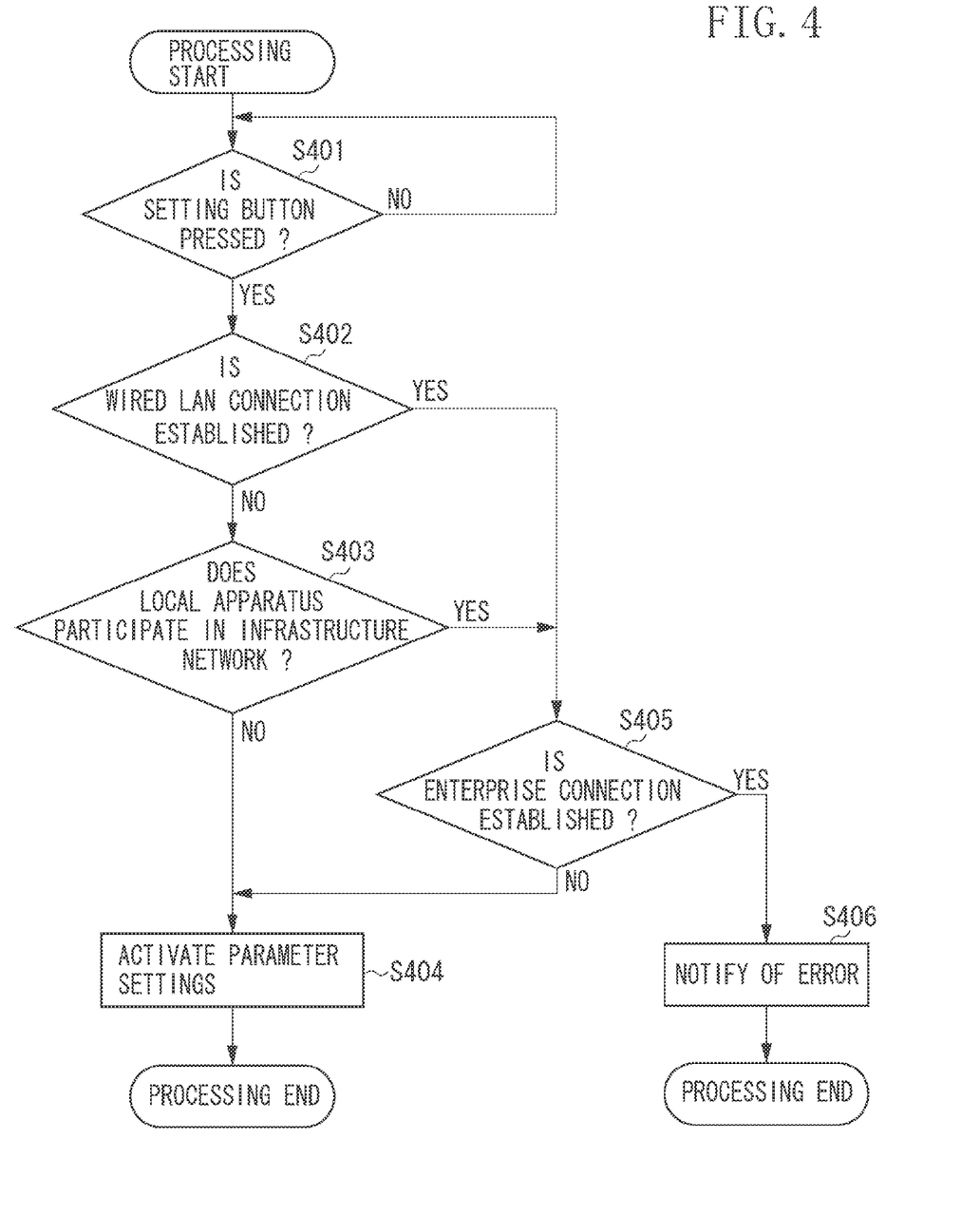
FIG. 4 is a flow chart of operations executed by an apparatus according to a first exemplary embodiment.

FIG. 4 is a flow chart illustrating processing executed by the apparatus A. The processing illustrated in FIG. 4 is performed by the control unit 102 reading and executing a control program stored in the storage unit 103. Control performed by each apparatus will be described below along the flow chart.

First, in step S401, the apparatus A determines whether the setting button 106 for issuing an instruction to start automatic setting of the communication parameters is pressed. If the apparatus A determines that the setting button 106 has been pressed (YES in step S401), the apparatus A determines whether the own apparatus participates in any network.

While a case where the setting button 106 is pressed is described here, if automatic settings are performed by using a personal identification number (PIN) code, whether the PIN code is input may be determined by using the input unit 109, instead of an operation of the setting button 106.

In step S402, if the apparatus A is equipped with a wired LAN, the apparatus A determines whether the own apparatus has established a wired LAN connection. If it is determined that the own apparatus has not established the wired LAN connection (NO in step S402), then in step S403, the apparatus A determines whether the own apparatus participates in an infrastructure network.

When it is determined that the own apparatus does not participate in the infrastructure network (NO in step S403), the apparatus A is in a standalone state in which the apparatus A does not belong to any network or in a state in which the apparatus A participates in an ad hoc network. If the apparatus A is in this state, no issue arises if an ad hoc network is formed by performing automatic setting of the communication parameters. Therefore, the processing proceeds to step S404 to perform communication parameter setting processing.

In step S402 or S403, if the apparatus A determines that the own apparatus is connected to the wired LAN or the infrastructure network (YES in step S402 or S403), the processing proceeds to step S405. In step S405, the apparatus A performs determination processing whether the own apparatus has established an enterprise connection.

If the apparatus A determines that the own apparatus has established the enterprise connection (YES in step S405), then in step S406, the apparatus A stops the activation of automatic setting processing of the communication parameters and causes the output unit 105 to notify the user of an error. As a method of error notification, a message indicating that the enterprise connection is being established (or exists) or a message indicating that the automatic setting of the communication parameters is not permitted may be displayed or a warning sound by a buzzer may be output.

If the apparatus A determines that the own apparatus has not established the enterprise connection (NO in step S405), the processing proceeds to step S404.

When the processing proceeds to step S404, the apparatus A activates the automatic setting processing of the communication parameters. More specifically, the apparatus A first determines whether the own apparatus becomes a providing apparatus to provide the communication parameters or a receiving apparatus to receive the communication parameters as a role to share the communication parameters. Then, the apparatus determined to be the receiving apparatus requests the apparatus determined to be the providing apparatus to provide the communication parameters, and the providing apparatus provides the communication parameters in response to the request. As a method for providing the communication parameters after the role being determined, the Registration protocol specified in the WPS may be used.

As a method for determining the role, for example, if the apparatus A participates in the ad hoc network, the apparatus A can provide the communication parameters of the ad hoc network being participated in to the apparatus B by being determined to be the providing apparatus. If the apparatus A participates in no network, one of the apparatus A and the apparatus B may be determined to be the providing apparatus according to a predetermined protocol (a method discussed, for example, in Japanese Patent Application Laid-Open No. 2008-187348).

When the communication parameter setting processing is completed, the apparatus A forms the network A using the communication parameters shared with the apparatus B, and then the apparatus A can perform data communication.

In the present exemplary embodiment, as described above, the security state of the connected network is determined and whether to activate the communication parameter setting processing or not is switched (determined) according to the determined security state. More specifically, if the apparatus A is in a state of enterprise connection being established, the activation of the communication parameter setting processing is restricted even if an instruction to start the communication parameter setting processing is provided by the user. Therefore, the possibility of confidential information of the enterprise connected network to be leaked to the apparatus B can be reduced, and security can be enhanced.

Several security levels of the network may be set, so that whether to activate the communication parameter setting processing or not is switched (determined) according to the security level of the network to which the apparatus A is connected. The security level can be determined based on a difference of authentication methods. Accordingly, detailed security control can be performed.

In the above description, when an instruction operation such as the press-down of the setting button 106 or an operation of the input unit 109 to start communication parameter settings is performed, the security state of the network to which the own apparatus is connected is determined before whether to perform automatic setting processing of the communication parameters is determined. However, the connected state of the network and the security state of the connected network may be determined in advance so that the user is disabled from activating automatic setting of the communication parameters according to the determination result. If, for example, the own apparatus has established the enterprise connection, the user may be disabled from issuing an instruction to start the automatic setting by disabling an operation by the setting button 106 or graying out the setting button.

The first exemplary embodiment has been described by assuming that the automatic setting processing of the communication parameters is performed if the own apparatus has not established the enterprise connection, even if the own apparatus is connected to the wired LAN or the infrastructure network. However, when the own apparatus is connected to the wired LAN or the infrastructure network, participation in some backbone network is expected even if the own apparatus has not established the enterprise connection. Therefore, there is a possibility that backbone network information is leaked by performing automatic setting of the communication parameters in this case. Thus, in a second exemplary embodiment, an example in which whether to perform communication parameter setting processing or not is switched (determined) even in such a case in consideration of security will be described.

Figure 5:
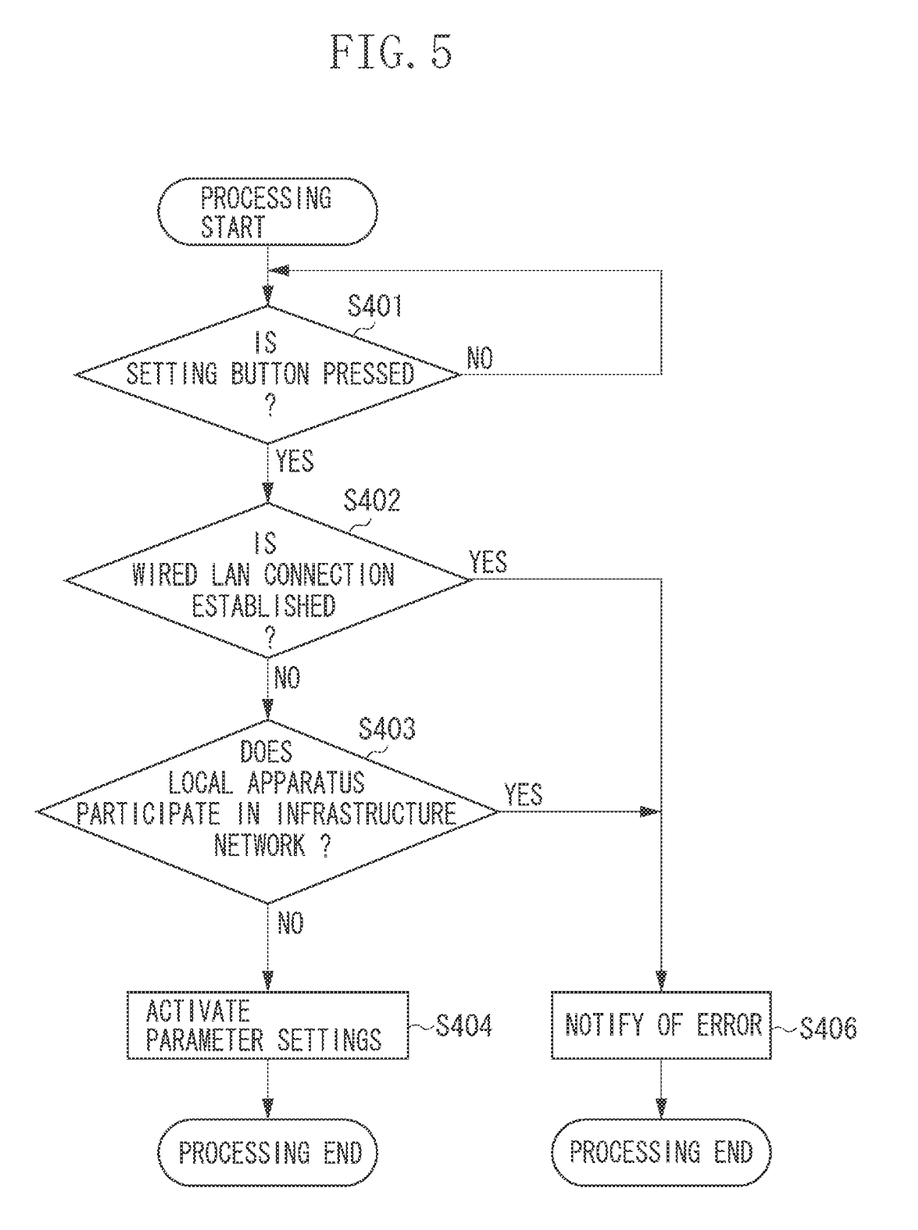
FIG. 5 is a flow chart of operations executed by an apparatus according to a second exemplary embodiment.

FIG. 5 is a flow chart illustrating processing executed by the apparatus A in the present exemplary embodiment. The same reference numerals are attached to the similar processing as that in FIG. 4.

In the present exemplary embodiment, if the own apparatus is connected to the wired LAN or the infrastructure network (YES in step S402 or S403), the processing proceeds to step S406. In step S406, an error notification is made without activating automatic setting processing of the communication parameters regardless of whether the own apparatus has established the enterprise connection.

Thus, according to the present exemplary embodiment, if there is a possibility that the apparatus A is connected to the backbone network, the automatic setting processing of the communication parameters is not performed and therefore, devices can be prevented from being directly connected by the ad hoc network. Consequently, the possibility that the backbone network information is leaked can be reduced, and the security can be enhanced.

In the above description, a case where processing immediately terminates if the apparatus A is connected to the wired LAN or the infrastructure network is described. However, a confirmation message may be displayed to a user to allow the user to select whether to perform setting processing. For example, a message like "The apparatus is currently connected to the infrastructure network. Do you want to continue to set the communication parameters?" may be displayed to switch (determine) whether to perform communication parameter setting according to the operation of the input unit 109 by the user.

By allowing the user to select whether to perform automatic setting of the communication parameters in this manner even if the apparatus A is connected to the wired LAN or the infrastructure network, operability can be improved. It is assumed, for example, that the infrastructure network of the wireless LAN is established in a home and a printer for printing from a personal computer (PC) is wireless-connected to an access point. A case where the setting button 106 of the printer and that of a digital camera are pressed down to print an image stored in the digital camera of a friend is considered. In this case, if automatic setting processing is disabled without exception when the setting button 106 is pressed to establish a temporary wireless connection, such processing may adverse the user's intention. Therefore, by allowing the user to select the processing as described above, the security can be ensured and the operability can be improved at the same time.

In the above description, when an instruction operation such as the press-down of the setting button 106 or an operation of the input unit 109 to start communication parameter settings is performed, whether the own apparatus is connected to the wired LAN or the infrastructure network is determined. However, the connected state of the network and the connected network may be determined in advance so that the user is disabled from activating automatic setting of the communication parameters according to the determination result. If, for example, the own apparatus is connected to the wired LAN or the infrastructure network, the user may be disabled from issuing an instruction to start the automatic setting by disabling an operation by the setting button 106 or graying out the setting button.

In the first and second exemplary embodiments, whether to perform automatic setting processing of the communication parameters or not is switched (determined) according to the network to which the own apparatus is currently connected. However, whether to perform automatic setting processing may be switched (determined) according to a setting regarding the network connection regardless of whether the own apparatus is connected to the network.

Figure 6:
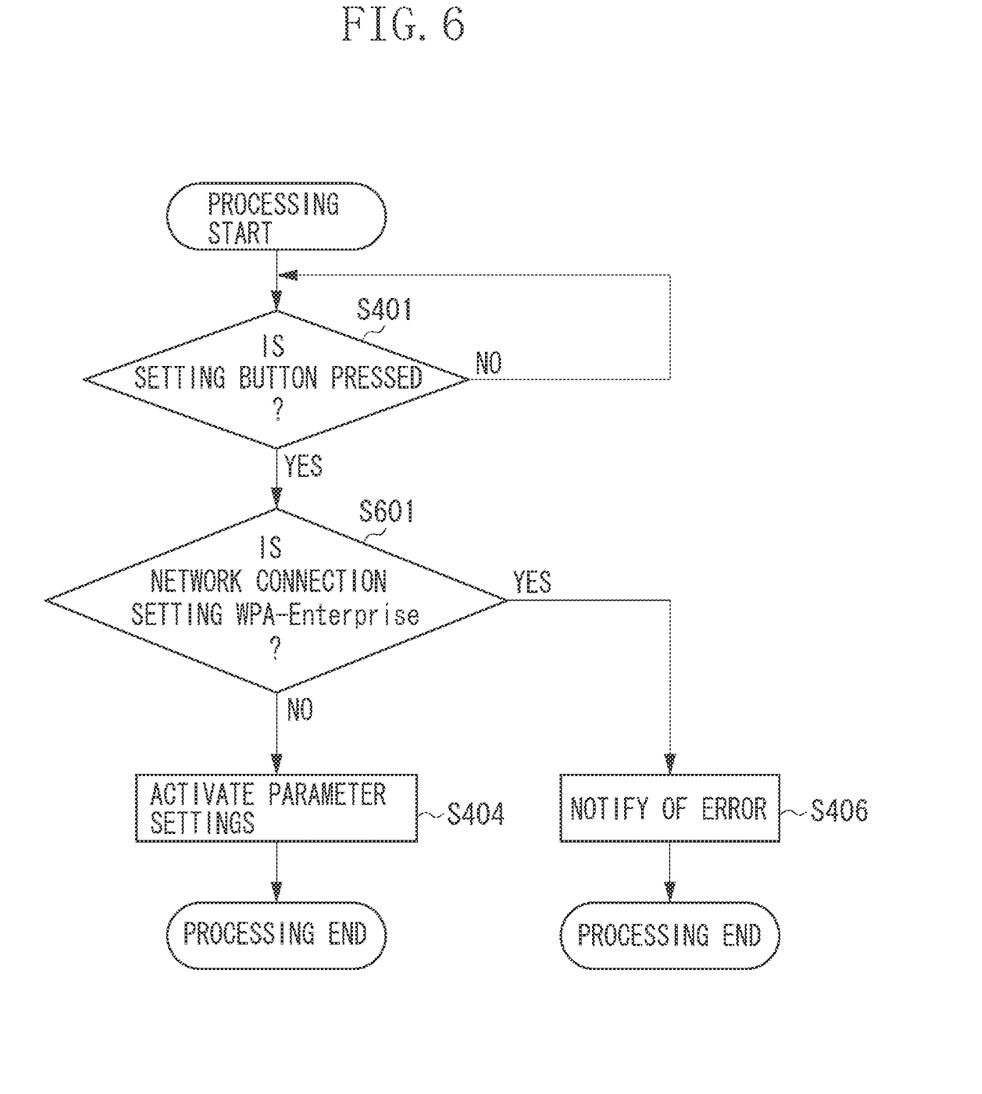
FIG. 6 is a flow chart of operations executed by an apparatus according to a third exemplary embodiment.

FIG. 6 is a flow chart illustrating processing executed by the apparatus A in a third exemplary embodiment. The same reference numerals are attached to the similar processing as that in FIGS. 4 and 5. Comparison with FIG. 5 shows that step S601 is added instead of steps S402 and S403.

In step S601, the apparatus A confirms whether the wireless LAN is set to "WPA-Enterprise" (or "WPA2-Enterprise"). If "WPA-Enterprise" is set, the apparatus A does not perform automatic setting of the communication parameters and if "WPA-Enterprise" is not set, that is, "WPA-Personal" is set, the apparatus A performs the automatic setting of the communication parameters.

In this way, whether to perform automatic setting processing can be switched (determined) only by confirming the setting of the wireless network connection, so that security can be enhanced by simple processing. For example, the wireless connection to the access point may temporarily be cut off due to changes in wireless environments even if the wireless network connection is established with WPA-Enterprise. According to the above method, if "WPA-Enterprise" is set, automatic setting processing is not performed even if the wireless connection is temporarily cut off. Therefore, even if the wireless connection to the access point is restored thereafter, the possibility that the backbone network information is leaked to other apparatuses can be reduced.

In the above description, it is assumed that whether "WPA-Enterprise" or "WPA-Personal" is set is confirmed. However, it is necessary to be careful about how such settings are referred to as according to device specifications. For example, "WPA-Enterprise" is used in some cases instead of "WPA" and "WPA-Pre-Shared Key (WPA-PSK)" instead of "WPA-Personal".

Further in the above description, when an instruction operation such as the press-down of the setting button 106 or an operation of the input unit 109 to start communication parameter settings is performed, whether to perform automatic setting processing of the communication parameters is determined by confirming the network connection setting. However, the network connecting setting may be confirmed in advance so that the user is disabled from activating automatic setting of the communication parameters according to the confirmation result. For example, if "WPA-Enterprise" is set, the user may be disabled from issuing an instruction to start the automatic setting by disabling an operation by the setting button 106 or graying out the setting button.

In each of the above described exemplary embodiments, a case where communication parameter setting processing is performed so that the apparatus A and the apparatus B form the ad hoc network has been described, however the network configuration is not limited to the above cases. For example, the present invention is applicable to communication parameter setting processing when either one of the apparatus A and the apparatus B operates as an access point and a network is established with the other apparatus for communication.

According to the present exemplary embodiments, as described above, the network in which the apparatus participates or the network connection setting is determined and whether to perform communication parameter setting processing is switched (determined) according to the determination result. Therefore, for example, when the enterprise connection is established and the enterprise connection is set, the ad hoc network can be prevented from being formed. Accordingly, the possibility that confidential information in the enterprise is leaked via the ad hoc network can be reduced.

The above description takes the wireless LAN conforming to IEEE802.11 as an example. However, the present invention can also be realized by other wireless communication media such as wireless Universal Serial Bus (USB), MultiBand OFDM Alliance (MBOA), Bluetooth (registered trademark), ultrawideband (UWB), and ZigBee (registered trademark). Moreover, the present invention can be realized by the wired communication medium such as the wired LAN.

MBOA is an abbreviation of Multi Band OFDM Alliance. UWB includes a wireless USB, wireless 1394, and WiMedia Network (WINET). While the network identifier, the encryption method, the encryption key, the authentication method, and the authentication key are taken as examples for the communication parameters, it is needless to say that other information may be taken or other information may be included in the communication parameters.

According to each of the exemplary embodiments, as described above, the security can be enhanced by performing processing to restrict the activation of setting processing of the communication parameters according to the network in which the communication apparatus participates or the setting concerning the wireless network connection of the communication apparatus.

Aspects of the present invention can also be realized by a computer of a system or apparatus (or devices such as a CPU (central processing unit) or MPU (main processing unit) or, for example, the "control unit 102" from FIG. 1. including a processor) that reads out and executes a program recorded on a memory device (for example "storage unit 103" from FIG. 1) to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2009-160762 filed Jul. 7, 2009, which is hereby incorporated by reference herein in its entirety.

What is claimed is:

1. A first communication apparatus comprising:
a processor and memory;
a processing unit configured to execute a communication parameter sharing processing for sharing a communication parameter to perform wireless communication between the first communication apparatus and a second communication apparatus in a second network different from a first network;
a determination unit configured to determine an authentication method for participating in the first network established by an access point; and
a control unit configured to control the processing unit to restrict execution of the communication parameter sharing processing with the second communication apparatus different from the access point in a case that the first communication apparatus is participating in the first network and the determination unit determines that the authentication method for participating in the first network is an authentication method by which an external apparatus different from the access point performs authentication,
wherein at least one of the processing unit, the determination unit and the control unit is implemented by the processor and memory.

2. The first communication apparatus according to claim 1, wherein the determination unit determines the first network in a case that a user issues an instruction to start the communication parameter sharing processing.

3. The first communication apparatus according to claim 1, wherein the control unit invalidates an instruction operation to start the communication parameter sharing processing.

4. The first communication apparatus according to claim 1, wherein the control unit controls to restrict execution of the communication parameter sharing processing in a case that the first network is a wired network or a wireless network that performs communication via a base station.

5. The first communication apparatus according to claim 1, wherein the control, unit controls to restrict execution of the communication parameter sharing processing in a case that a setting concerning a wireless network connection of the first communication apparatus is WPA-Enterprise.

6. The first communication apparatus according to claim 1, wherein the communication parameter sharing includes processing to provide the communication parameter to the second communication apparatus.

7. The communication apparatus according to claim 1, wherein the communication parameter sharing includes processing to receive the communication parameter from the second communication apparatus.

8. The first communication apparatus according to claim 1, wherein the first communication apparatus determines a role to operate in the communication parameter sharing either as a providing apparatus to provide the communication parameter to the second communication apparatus or as a receiving apparatus to receive the communication parameter from the second communication apparatus, and either provides or receives the communication parameter according to the determination.

9. The communication apparatus according to claim 1, wherein the communication parameter comprises at least one of a network identifier, an encryption method, an encryption key, an authentication method, and an authentication key.

10. The communication apparatus according to claim 1, wherein the communication parameter sharing is performed by communication conforming to IEEE802.11 standard series.

11. The first communication apparatus according to claim 1, wherein the first network is an infrastructure network.

12. The first communication apparatus according to claim 1, wherein the control unit restricts activation of the communication parameter sharing in a case that a user issues an instruction to start the communication parameter sharing.

13. The first communication apparatus according to claim 1, wherein the control unit notifies a user of an error.

14. The first communication apparatus according to claim 1, wherein the control unit controls the first communication apparatus so that the first communication apparatus does not receive the instruction to start the communication parameter sharing from the user.

15. A method for controlling a first communication apparatus, comprising:

executing a communication parameter sharing processing for sharing a communication parameter to perform wireless communication between the first communication apparatus and a second communication apparatus in a second network different from a first network;
determining authentication method for participating in the first network established by an access point; and
restricting execution of the communication parameter sharing processing with the second communication apparatus different from the access point in a case the first communication apparatus is participating in the first network and it is determined that the authentication method for participating in the first network is an authentication method by which an external apparatus different from the access point performs authentication.

16. A non-transitory computer-readable storage medium which stores a computer-executable process to cause a computer to execute a method comprising:

executing a communication parameter sharing processing for sharing a communication parameter to perform wireless communication between the first communication apparatus and a second communication apparatus in a second network different from a first network;
determining authentication method for participating in the first network established by an access point; and
restricting execution of the communication parameter sharing processing with the second communication apparatus different from the access point in a case the first communication apparatus is participating in the first network and it is determined that the authentication method for participating in the first network is an authentication method by which an external apparatus different from the access point performs authentication.

* * * * *